United States Patent
Inayama

(10) Patent No.: US 9,815,521 B2
(45) Date of Patent: Nov. 14, 2017

(54) EXHAUST SYSTEM OF SADDLE-RIDE TYPE VEHICLE

(71) Applicant: SUZUKI MOTOR CORPORATION, Hamamatsu-shi, Shizuoka (JP)

(72) Inventor: Yoshisato Inayama, Hamamatsu (JP)

(73) Assignee: SUZUKI MOTOR CORPORATION, Hamamatsu-Shi, Shuzuoka (JP)

( * ) Notice: Subject to any disclaimer, the term of this patent is extended or adjusted under 35 U.S.C. 154(b) by 39 days.

(21) Appl. No.: 14/860,838

(22) Filed: Sep. 22, 2015

(65) Prior Publication Data

US 2016/0090891 A1    Mar. 31, 2016

(30) Foreign Application Priority Data

Sep. 25, 2014   (JP) ................................ 2014-195378

(51) Int. Cl.
 *B62M 7/04* (2006.01)
 *F01N 1/00* (2006.01)
 (Continued)

(52) U.S. Cl.
 CPC .............. *B62M 7/04* (2013.01); *B62K 11/04* (2013.01); *F01N 1/00* (2013.01); *F01N 13/08* (2013.01);
 (Continued)

(58) Field of Classification Search
 CPC . F01N 1/084; F01N 13/08; F01N 3/00; F01N 1/089; F01N 3/2842; B62M 7/04; B62K 11/04
 See application file for complete search history.

(56) References Cited

U.S. PATENT DOCUMENTS

| | | | | |
|---|---|---|---|---|
| 4,800,719 A | * | 1/1989 | Campbell | ............... F01N 13/08 181/266 |
| 4,809,800 A | * | 3/1989 | Suzuki | ................... B62K 11/00 180/219 |

(Continued)

FOREIGN PATENT DOCUMENTS

| | | |
|---|---|---|
| EP | 1975384 B1 | 11/2010 |
| EP | 2055908 B1 | 5/2011 |

(Continued)

OTHER PUBLICATIONS

Office Action issued during prosecution of German Application No. 102015116207.5 dated Nov. 10, 2016.

*Primary Examiner* — Hau V Phan
(74) *Attorney, Agent, or Firm* — Troutman Sanders LLP

(57) ABSTRACT

An exhaust system of a saddle-ride type vehicle includes an exhaust pipe portion, a chamber portion, and a silencer. The exhaust pipe portion is coupled to an engine supported by a frame. The exhaust pipe portion is configured to guide exhaust air. The chamber portion is coupled to the exhaust pipe portion. A cross section of the chamber portion is formed larger than the exhaust pipe portion. The silencer is coupled to the chamber portion. The chamber portion includes: a main body portion disposed below the frame, and a fixing bracket projecting upward from the main body portion. The fixing bracket is secured to the frame. The frame and the fixing bracket have a fixed position. The fixed position is positioned above a lower end of the frame.

7 Claims, 9 Drawing Sheets

(51) Int. Cl.
*B62K 11/04* (2006.01)
*F01N 13/08* (2010.01)
*F01N 13/18* (2010.01)

(52) U.S. Cl.
CPC ...... *F01N 13/1822* (2013.01); *F01N 2340/04* (2013.01); *F01N 2590/04* (2013.01)

(56) References Cited

U.S. PATENT DOCUMENTS

| | | | |
|---|---|---|---|
| 4,939,898 A * | 7/1990 | Ichimura | F02B 27/06 60/274 |
| 5,396,767 A * | 3/1995 | Suzuki | F01N 3/30 422/172 |
| 7,699,134 B2 | 4/2010 | Terashima | |
| 7,828,114 B2 | 11/2010 | Morita | |
| 8,033,357 B2 * | 10/2011 | Nishijima | F01N 1/084 180/296 |
| 2002/0153187 A1 * | 10/2002 | Tsukui | F01N 13/08 180/219 |
| 2005/0189166 A1 * | 9/2005 | Kikuchi | F01N 1/089 181/237 |
| 2007/0056790 A1 | 3/2007 | Shigeta et al. | |
| 2007/0068296 A1 * | 3/2007 | Oda | B62M 25/04 74/329 |
| 2009/0165448 A1 * | 7/2009 | Mitsukawa | F01N 3/2885 60/299 |
| 2009/0166115 A1 * | 7/2009 | Mizutani | B62H 1/04 180/68.3 |
| 2010/0212990 A1 | 8/2010 | Terashima et al. | |
| 2011/0225953 A1 | 9/2011 | Ono et al. | |
| 2013/0030649 A1 * | 1/2013 | Matsuda | B60T 8/1706 701/38 |
| 2013/0255238 A1 * | 10/2013 | Murakami | F01N 3/2842 60/299 |

FOREIGN PATENT DOCUMENTS

| | | |
|---|---|---|
| JP | 2007-008442 A1 | 1/2007 |
| JP | 2010269725 A | 12/2010 |
| JP | 2014195378 A | 10/2014 |

* cited by examiner

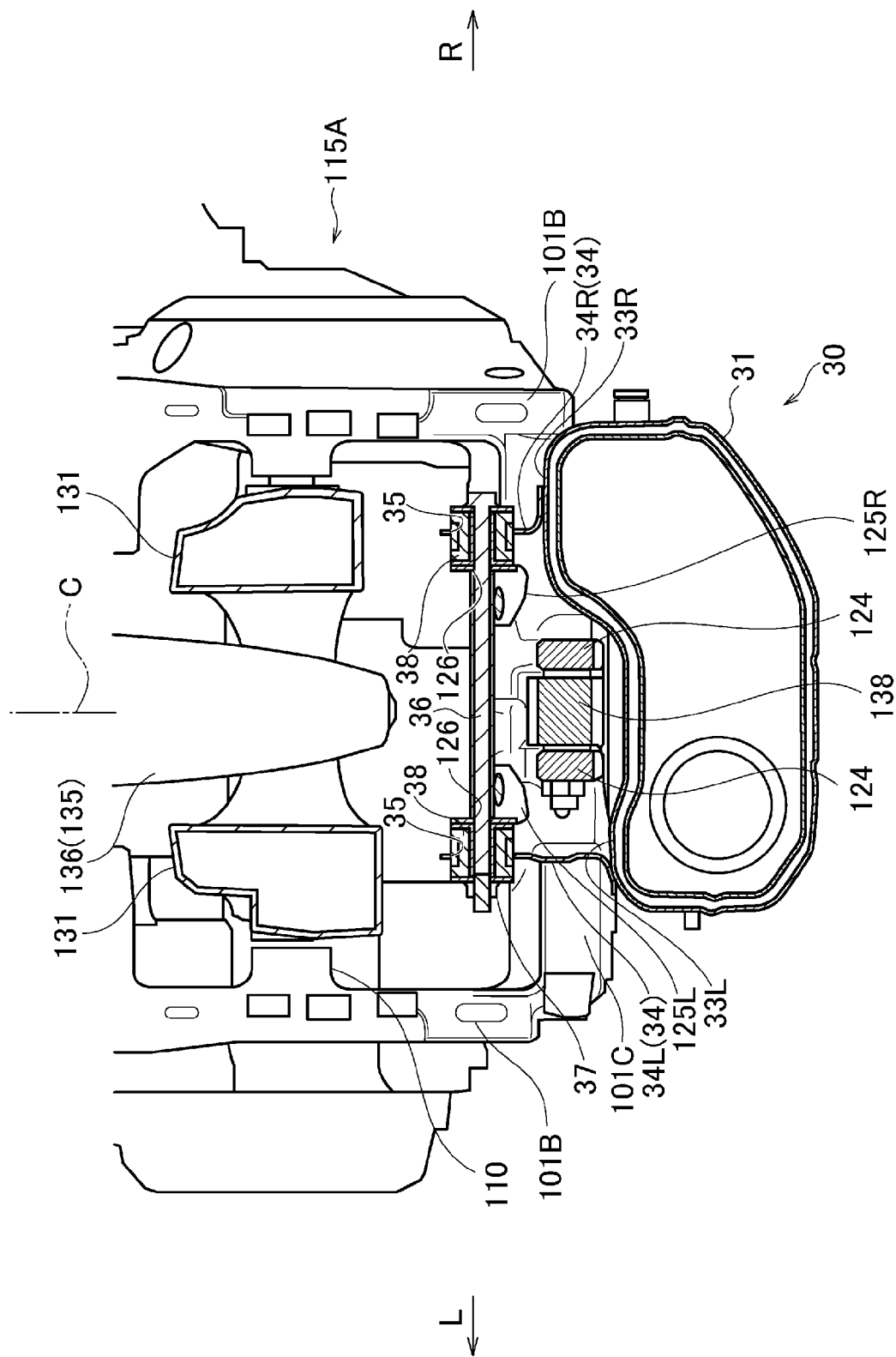

EXHAUST SYSTEM OF SADDLE-RIDE TYPE VEHICLE

CROSS-REFERENCE TO RELATED APPLICATION

This application is based upon and claims the benefit of priority of the prior Japanese Patent Application No. 2014-195378, filed on Sep. 25, 2014, the entire contents of which are incorporated herein by reference.

BACKGROUND OF THE INVENTION

Field of the Invention

The present invention relates to an exhaust system of a saddle-ride type vehicle.

Description of the Related Art

A motorcycle or a similar vehicle as a saddle-ride type vehicle includes an exhaust system, which exhausts exhaust gas from an engine to the outside. Some exhaust systems include a chamber portion. The cross section of the chamber portion is formed wider than an exhaust pipe. Forming the chamber portion allows expanding the exhaust gas in the chamber portion to ensure sound deadening.

Patent Document 1 discloses an exhaust system that includes a first muffler to which an exhaust pipe is coupled and a second muffler. The first muffler is disposed between a lower side of an engine and a rear wheel. The second muffler is coupled to the first muffler and is disposed at a lateral side of the rear wheel. Patent Document 1 discloses the exhaust system where the first muffler covers a part of a required muffler volume. This allows downsizing the second muffler and sophisticates a design around the rear.

Patent Document 1: Japanese Laid-open Patent Publication No. 2007-8442

The first muffler of the exhaust system disclosed in Patent Document 1 is suspendedly supported by a cross frame portion of a rear arm bracket, which is a part of a vehicle body frame, via right and left attachment brackets. However, since the fixed positions at which the right and left attachment brackets are secured to the cross frame portion are positioned on the lower side with respect to the cross frame portion. Accordingly, it is difficult to secure a wide space at the lower side of the cross frame portion where the first muffler is disposed. This arises a problem that the internal volume of the first muffler cannot be widely secured.

SUMMARY OF THE INVENTION

The present invention has been made to solve the above-described problems. An object of the present invention is to provide an exhaust system of a saddle-ride type vehicle that can widely secure the internal volume of the chamber portion.

An exhaust system of a saddle-ride type vehicle according to the present invention includes an exhaust pipe portion, a chamber portion, and a silencer. The exhaust pipe portion is coupled to an engine supported by a frame. The exhaust pipe portion is configured to guide exhaust air. The chamber portion is coupled to the exhaust pipe portion. A cross section of the chamber portion is formed larger than the exhaust pipe portion. The silencer is coupled to the chamber portion. The chamber portion includes: a main body portion disposed below the frame, and a fixing bracket projecting upward from the main body portion. The fixing bracket is secured to the frame. The frame and the fixing bracket have a fixed position. The fixed position is positioned above a lower end of the frame.

BRIEF DESCRIPTION OF THE DRAWINGS

FIG. 9 is a cross-sectional view taken along the line III-III in FIG. 7.

DETAILED DESCRIPTION OF THE PREFERRED EMBODIMENTS

The following describes preferable embodiments of an exhaust system of a saddle-ride type vehicle according to the present invention with reference to the drawings. This embodiment describes the case where the exhaust system is applied to a motorcycle.

Figure 1:
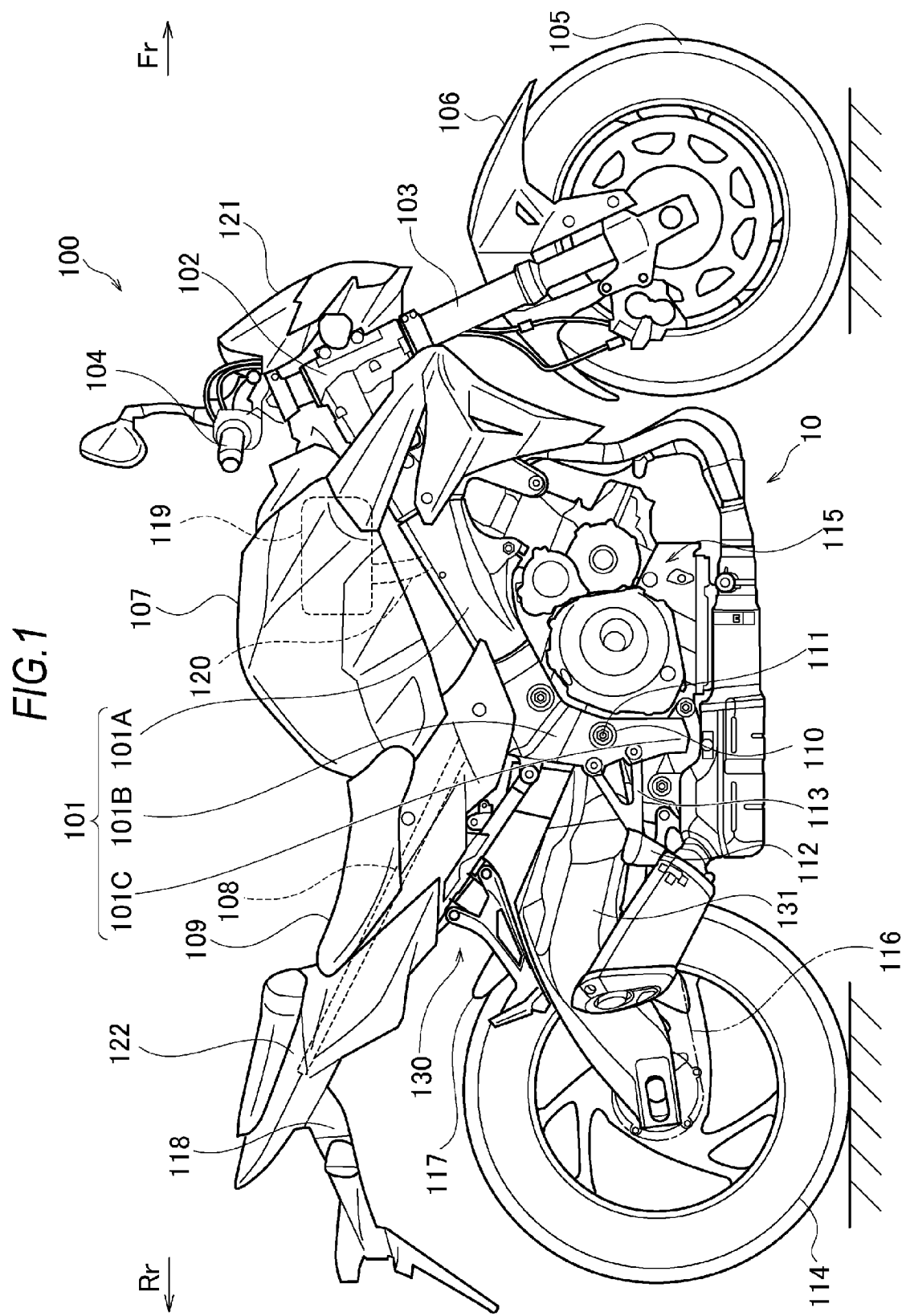
FIG. 1 is a right side view illustrating an overall configuration of a motorcycle.
Figure 2:
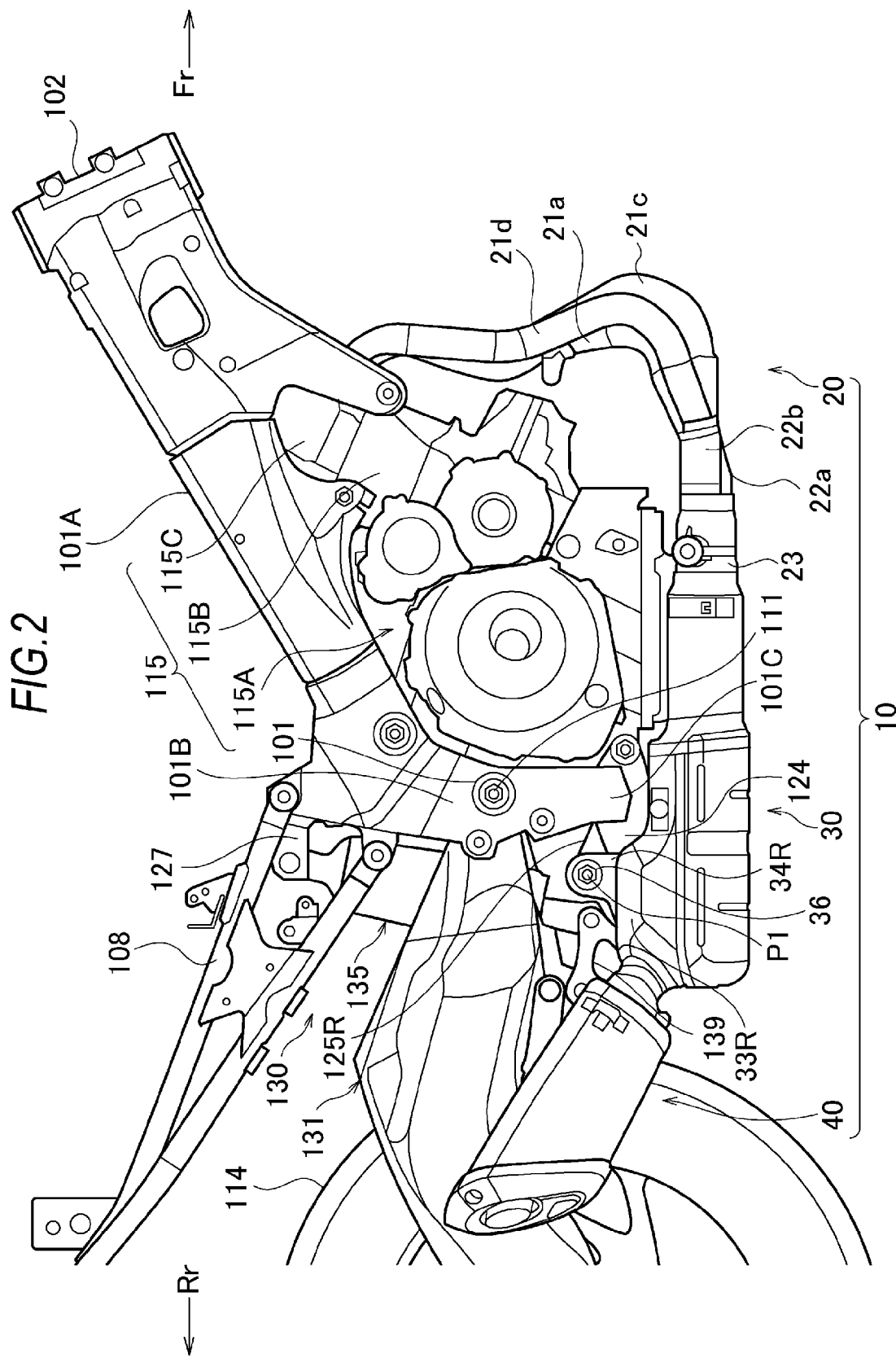
FIG. 2 is a right side view illustrating a configuration around an engine.
Figure 3:
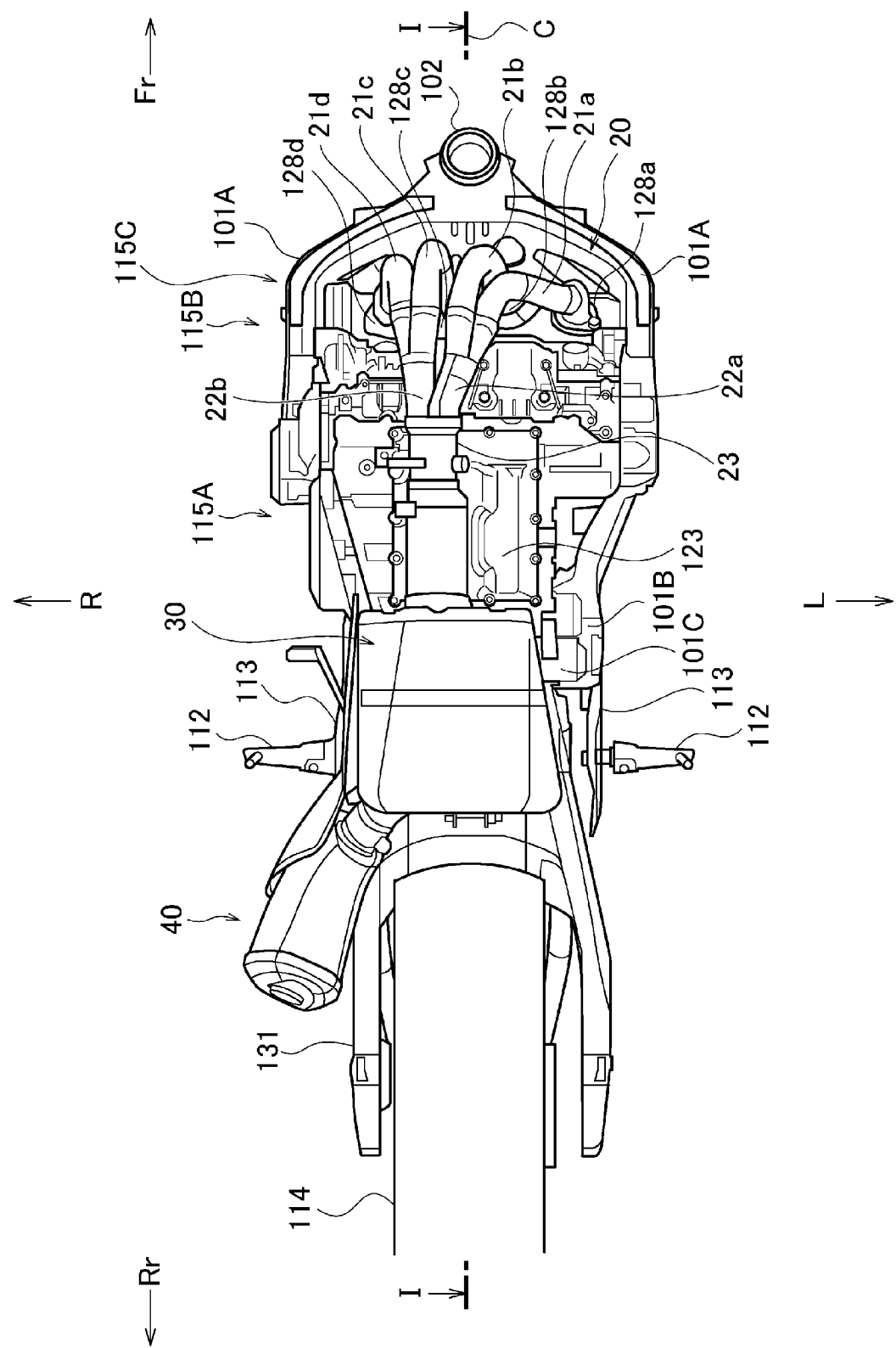
FIG. 3 is a bottom view illustrating a configuration of a motorcycle.

FIG. 1 is a right side view illustrating an overall configuration of a motorcycle 100. FIG. 2 is a right side view illustrating a configuration around an engine 115. FIG. 3 is a bottom view illustrating the configuration of the motorcycle 100. First, using these drawings, the following describes the overall configuration of the motorcycle 100. Including FIG. 1 to FIG. 3, the drawings used in the following description indicate the front side of the vehicle by an arrow Fr and the rear side of the vehicle by an arrow Rr as necessary. Additionally, an arrow R indicates the right side of the vehicle while the arrow L indicates the left side of the vehicle.

As illustrated in FIG. 1, the motorcycle 100 includes two of right and left front forks 103 at a front portion of a frame 101 made of steel or an aluminum alloy material. The right and left front forks 103 are turnably supported laterally by a steering head pipe 102. To the upper end of the front fork 103, a handlebar 104 is secured. A front wheel 105 is rotatably supported at the lower portion of the front fork 103. The front wheel 105 is covered with a front fender 106 from the upper side.

The frame 101 includes a tank rail 101A. The tank rail 101A is integrally joined to the rear portion of the steering head pipe 102. The tank rail 101A branches into a right and left pair of two portions rearward. The tank rail 101A extends from the steering head pipe 102 while widening obliquely downward to the rear. The tank rail 101R supports a fuel tank 107 or a similar member. A seat rail 108 extends from the proximity of the rear end of the tank rail 101A to obliquely upward to the rear. The seat rail 108 supports a seat 109 on which a vehicle occupant is seated.

The frame 101 includes a frame body portion 101B. The frame body portion 101B is joined to the rear end of the tank rail 101A. The right and left pair of the frame body portions 101B extend downward from the rear end. The frame body portion 101B includes a swing arm support portion 110 at the approximately center in the vertical direction. The swing arm support portion 110 joins the swing arm 131, which constitutes a rear wheel suspension device 130, via a pivot shaft 111 so as to be swingable in the vertical direction. At the rear end of the frame body portion 101B, steps 112 on which the vehicle occupant puts his/her foot are mounted via brackets 113.

The frame 101 includes a frame bridge portion 101C. The frame bridge portion 101C couples the lower ends of the right and left pair of the frame body portions 101B across the vehicle-width direction (also see FIG. 4 described later).

A rear wheel 114 is rotatably supported to the rear end of the swing arm 131. The rear wheel 114 is rotatably driven by a chain 116, which transmits power from the engine 115. The rear wheel 114 is covered with an inner fender 117 from obliquely upward on the front and is covered with a rear fender 118 from the above.

The engine 115 is mounted and supported at the approximately vehicle center portion of the motorcycle 100 by the frame 101. The engine 115 of this embodiment employs, for example, four-cycle multi cylinder, typically, a four-cylinder engine. As illustrated in FIG. 2, the engine 115 is formed by integrally joining a crankcase 115A, a cylinder block 115B, and a cylinder head 115C. The cylinder block 115B extends from the crankcase 115A inclined forward. The cylinder head 115C is disposed at the upper portion of the cylinder block 115B. The engine 115 is suspended to the frame 101 via a plurality of engine mounts. Thus, the engine 115 is integrally joined to the frame 101.

As illustrated in FIG. 1, between the engine 115 and the fuel tank 107, an air cleaner 119 is disposed. The air cleaner 119 supplies the engine 115 with cleaned air. The air purified by the air cleaner 119 is taken by an intake device (not illustrated). The air is mixed with fuel in an intake pipe 120 and is supplied to the engine 115 as air-fuel mixture. The exhaust gas generated by burning the air-fuel mixture in the engine 115 is exhausted via the exhaust system 10.

In the vehicle exterior, a front cowling 121 covers the vehicle front portion. A tail cowling 122 covers both right and left sides and the rear side of the vehicle.

The following describes the exhaust system 10 according to the embodiment.

As illustrated in FIG. 2, the exhaust system 10 includes an exhaust pipe portion 20, a chamber portion 30, and a silencer 40.

As illustrated in FIG. 3, the exhaust pipe portion 20 includes first to fourth exhaust pipes 21a to 21d, a first junction pipe 22a, a second junction pipe 22b, and a collecting pipe 23. The first to fourth exhaust pipes 21a to 21d are coupled to respective exhaust ports 128a to 128d of respective cylinders of the cylinder head 115C. The first to fourth exhaust pipes 21a to 21d are formed so as to pass through the front side of the cylinder block 115B and the front side of the crankcase 115A, extend downward, and then curve rearward.

The first exhaust pipe 21a and the second exhaust pipe 21b are coupled to the first junction pipe 22a. The third exhaust pipe 21c and the fourth exhaust pipe 21d are coupled to the second junction pipe 22b. The first junction pipe 22a and the second junction pipe 22b are disposed such that the axis line goes along the front-rear direction below the crankcase 115A.

The first junction pipe 22a and the second junction pipe 22b are coupled to the collecting pipe 23.

The collecting pipe 23 is disposed such that the axis line goes along the front-rear direction below the crankcase 115A. The collecting pipe 23 is disposed at a position slightly biased to one side (the right side) from a vehicle center line C in the vehicle-width direction to avoid interference with an oil pan 123 at the lower portion of the crankcase 115A. The oil pan 123 is formed from the other side (the left side) to downward in the vehicle-width direction. The chamber portion 30 is coupled to the rear end of the collecting pipe 23.

The cross section of the chamber portion 30 taken along the vehicle-width direction and viewed from the vehicle-front-rear direction is formed larger than the collecting pipe 23 to widely secure the internal volume of the chamber portion 30. As illustrated in FIG. 2, the chamber portion 30 is positioned forward with respect to the rear wheel 114 and at the lower side of the rear wheel suspension device 130 in a vehicle side view. The chamber portion 30 is formed into an approximately flat shape. As illustrated in FIG. 3, the chamber portion 30 is positioned at the approximately center in the vehicle-width direction and between the right and left steps 112 in the vehicle bottom view. The chamber portion 30 is formed into an approximately rectangular shape. The silencer 40 is coupled to the right rear end and on the upper side of the chamber portion 30.

As illustrated in FIG. 2, the silencer 40 extends from the chamber portion 30 obliquely upward to the rear. The silencer 40 is positioned on one side (the right side) of the rear wheel 114 in the vehicle-width direction and on the front side with respect to a rotation shaft of the rear wheel 114 in the vehicle side view.

With the exhaust system 10 configured as described above, the exhaust gas from the engine 115 is guided to the chamber portion 30 from the first to fourth exhaust pipes 21a to 21d, via the first junction pipe 22a and the second junction pipe 22b, and is collected to the single collecting pipe 23. The exhaust gas guided to the chamber portion 30 is expanded in the internal wide space and then is silenced. Subsequently, the exhaust gas is introduced to the silencer 40, is further silenced by the silencer 40, and then is discharged to the external air. With the exhaust system 10 of this embodiment, the chamber portion 30 silences the exhaust gas to some extent. This allows employing the compact silencer 40, ensuring simplifying the design around the rear wheel 114.

The exhaust system 10 of this embodiment is secured to the frame 101 with a securing structure by which the internal volume of the chamber portion 30 can be widely secured. Here, first, the following describes the configuration of the frame 101 related to the securing structure of the chamber portion 30 and the configuration of the rear wheel suspension device 130.

Figure 4:
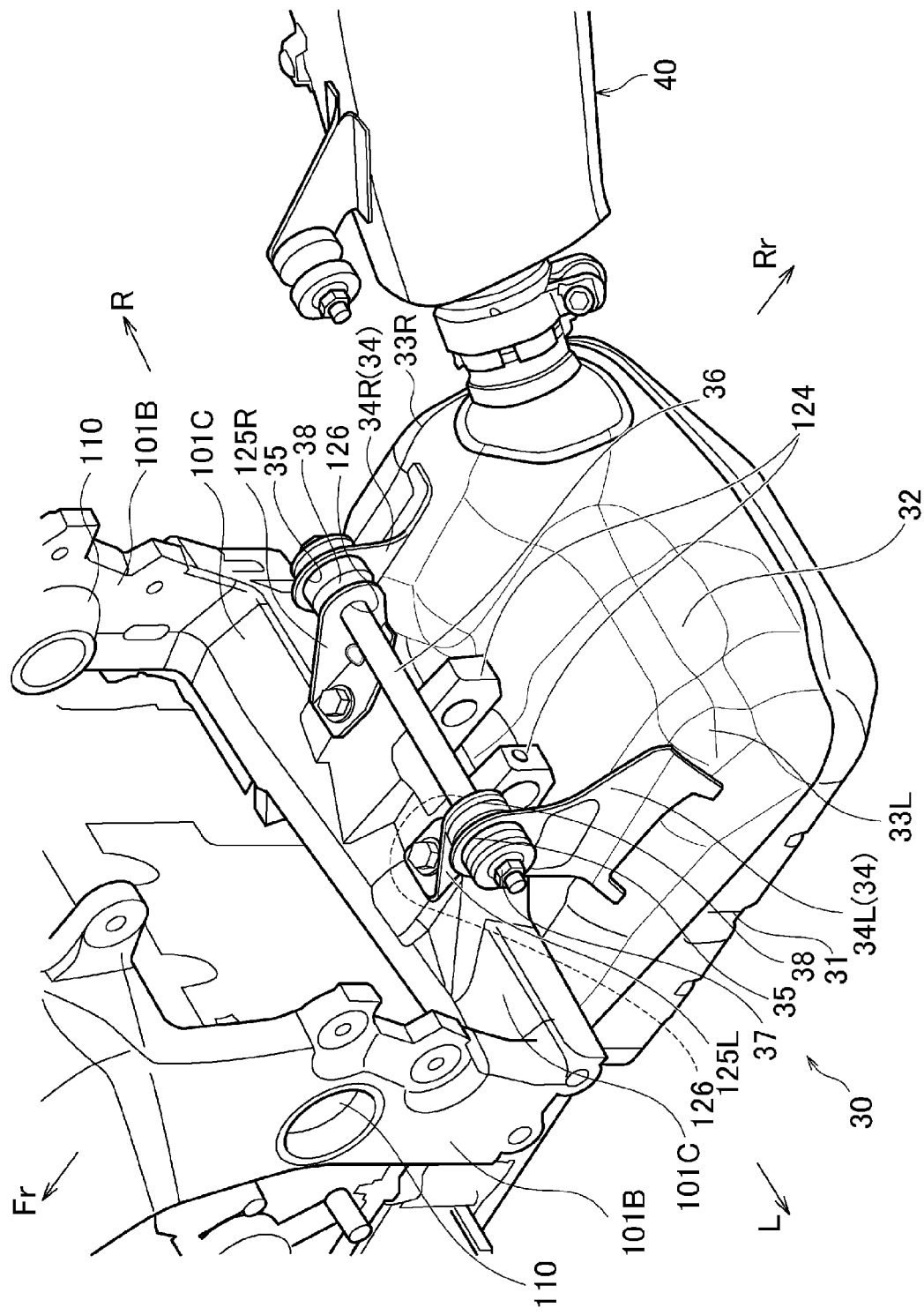
FIG. 4 is a perspective view when a chamber portion is viewed from obliquely rearward.

FIG. 4 is a perspective view when the chamber portion 30 is viewed from obliquely rearward.

As illustrated in FIG. 4, the frame bridge portion 101C of the frame 101 is disposed along the lateral direction. At the rear surface of the frame bridge portion 101C, a right and left pair of link support portions 124 are disposed. The link support portions 124 are integrally formed extending rearward. On the top surface of the frame bridge portion 101C, a right side support plate 125R and a left side support plate 125L are secured with bolts. The right side support plate 125R and the left side support plate 125L are positioned separately to the right and left to support the chamber portion 30. The right side support plate 125R and the left side support plate 125L each extend obliquely upward to the rear, and fixing holes 126 are drilled at the rear portions.

As illustrated in FIG. 2, at the rear end of the tank rail 101A or the upper end of the frame body portion 101B, a right and left pair of unit support portions 127 extending rearward are integrally formed.

Figure 5:
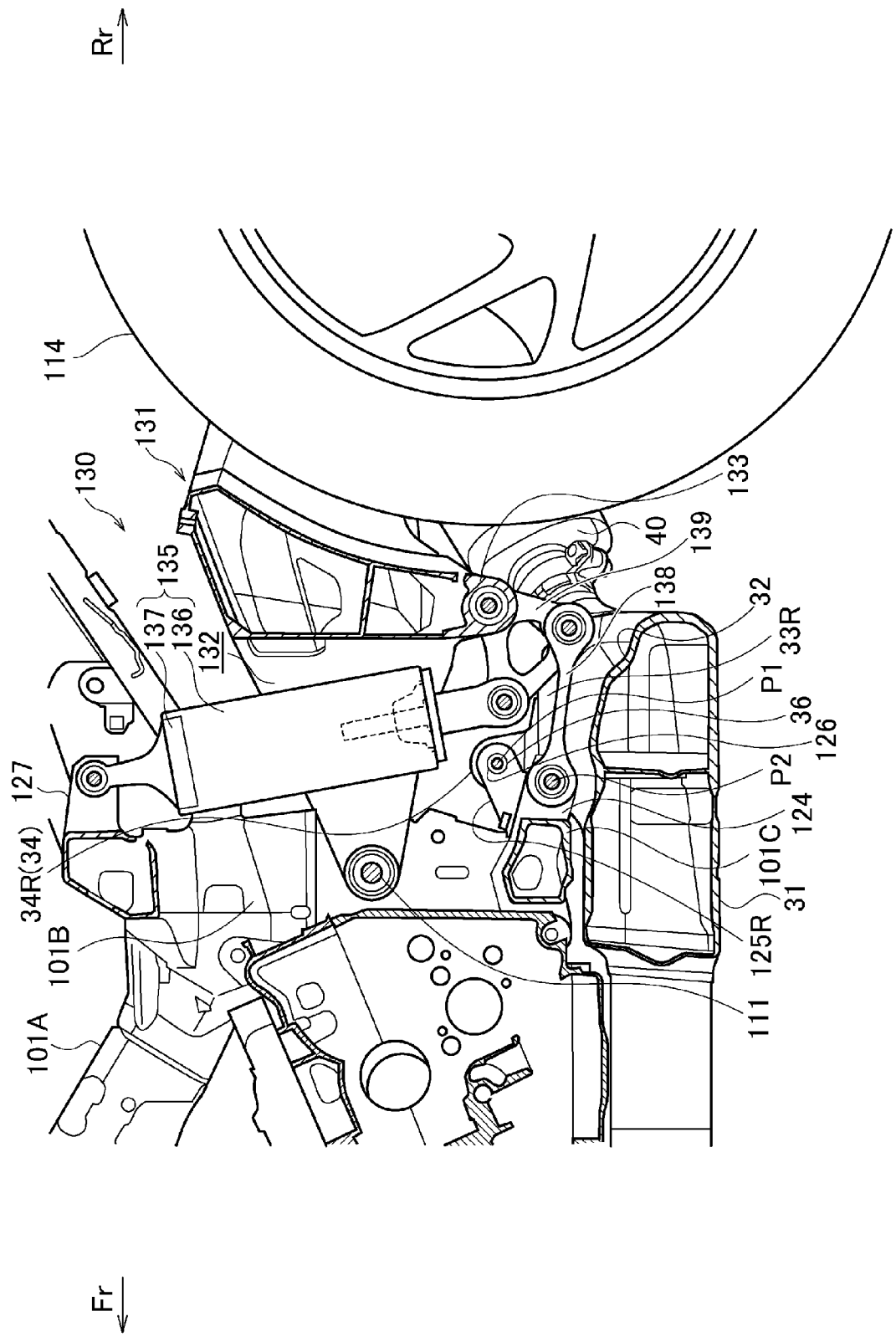
FIG. 5 is a cross-sectional view taken along the line I-I in FIG. 3.
Figure 6:
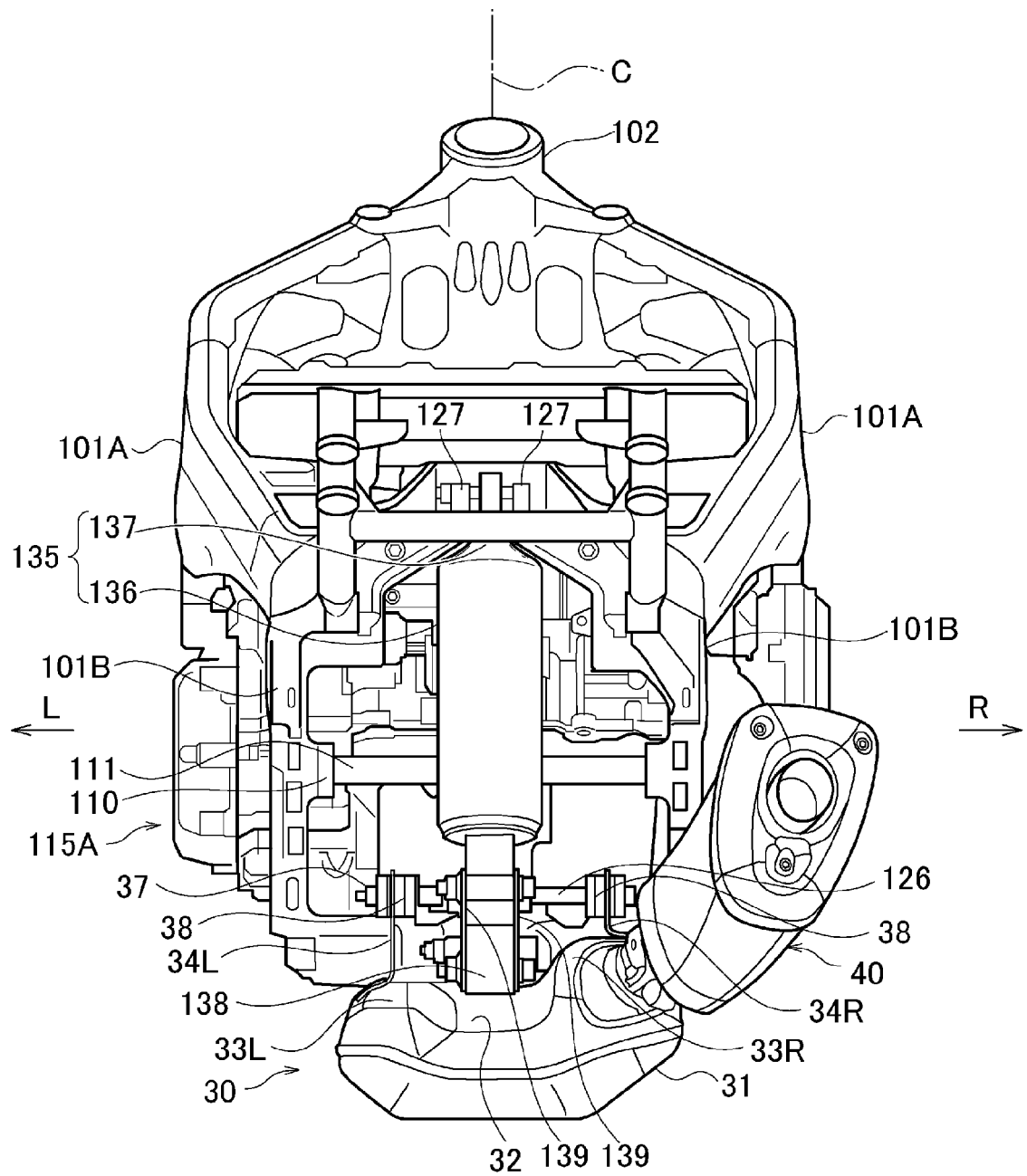
FIG. 6 is a drawing when an exhaust system is viewed from a rear wheel side.

FIG. 5 is a cross-sectional view of the motorcycle 100 taken along the line I-I in FIG. 3 and viewed from the arrow direction. FIG. 6 is a drawing when the exhaust system 10 is viewed from the rear wheel 114 side.

The rear wheel suspension device 130 includes a swing arm 131, a rear cushion unit 135, a first link member 130, and a second link member 139.

The swing arm 131 is formed so as to vertically expand as heading rearward from the pivot shaft 111. In the front of the swing arm 131, a space 132 is formed. The space 132 causes the rear cushion unit 135 to be inserted through vertically. The center portion of the swing arm 131 is coupled across the right and left. At the lower end of the swing arm 131, a coupling portion 133 is formed. The coupling portion 133 is coupled to the second link member 139. The rear portion of the swing arm 131 branches into a right and left pair of two portions rearward to support the rear wheel 114 from both the right and left sides.

The rear cushion unit 135 includes a coil spring 136 and a shock absorber 137. The rear cushion unit 135 is vertically inserted through the inside of the space 132 of the swing arm 131. The rear cushion unit 135 is disposed in a state where the upper portion is slightly inclined forward. The upper end of the rear cushion unit 135 is coupled to the unit support portion 127 of the frame 101. The lower end is coupled to the second link member 139. As illustrated in FIG. 6, the rear cushion unit 135 is disposed at the center in the vehicle-width direction.

The first link member 138 is formed into a rod shape. The first link member 138 is disposed along the front-rear direction at the lower side of the rear cushion unit 133. The front end of the first link member 138 is coupled to the link support portion 124 of the frame bridge portion 101C. The rear end is coupled to the second link member 139. As illustrated in FIG. 6, the first link member 138 is disposed at the center in the vehicle-width direction.

The second link member 139 is a right and left pair having a plate shape. The second link member 139 is formed into an approximately triangular shape in the vehicle side view. The second link member 139 is disposed below the swing arm 131. The front end of the second link member 139 is coupled to the rear cushion unit 135. The upper rear end is coupled to the coupling portion 133 of the swing arm 131. The lower rear end is coupled to the first link member 138.

Figure 7:
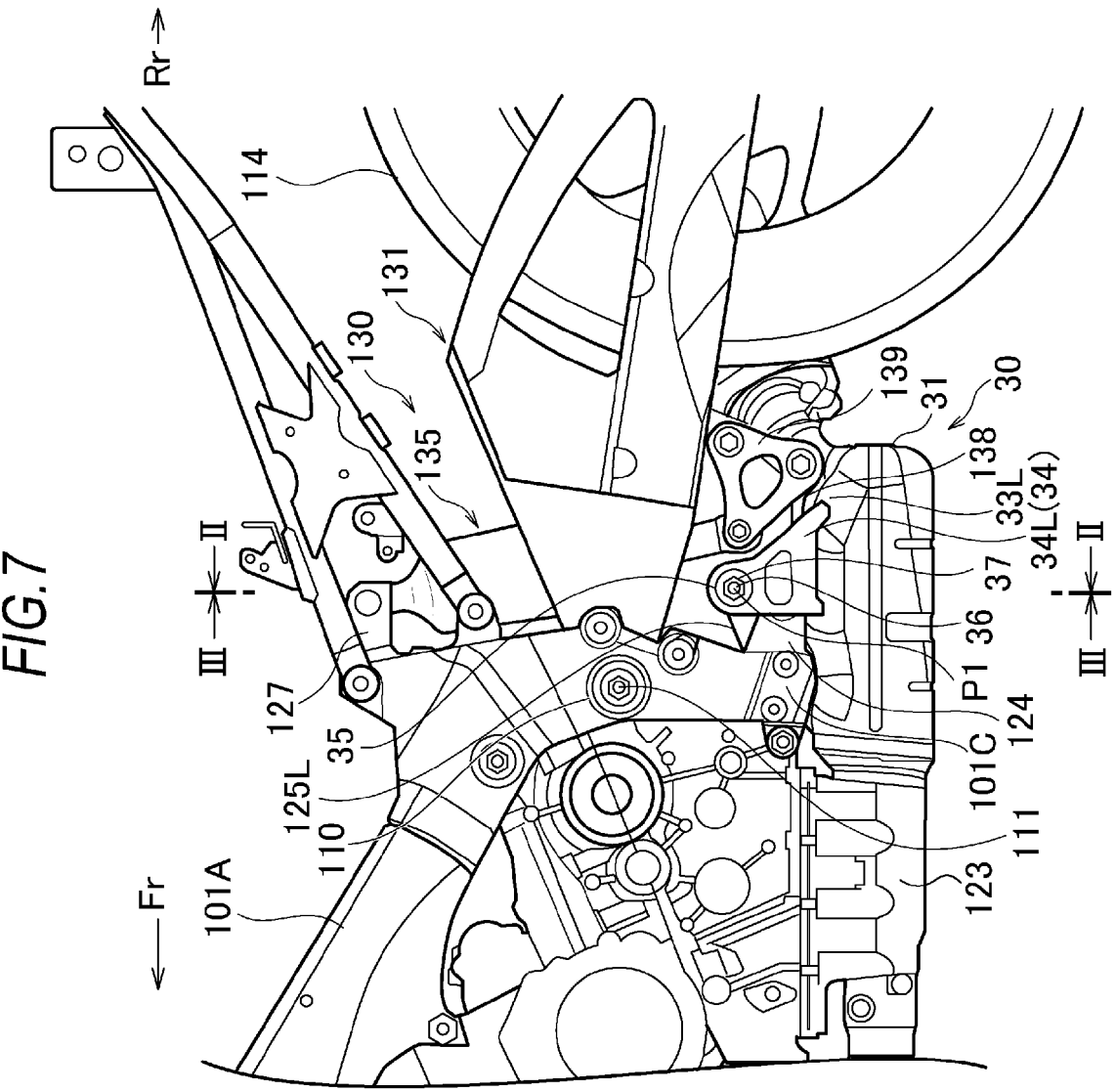
FIG. 7 is a left side view illustrating a configuration around the chamber portion.
Figure 8:
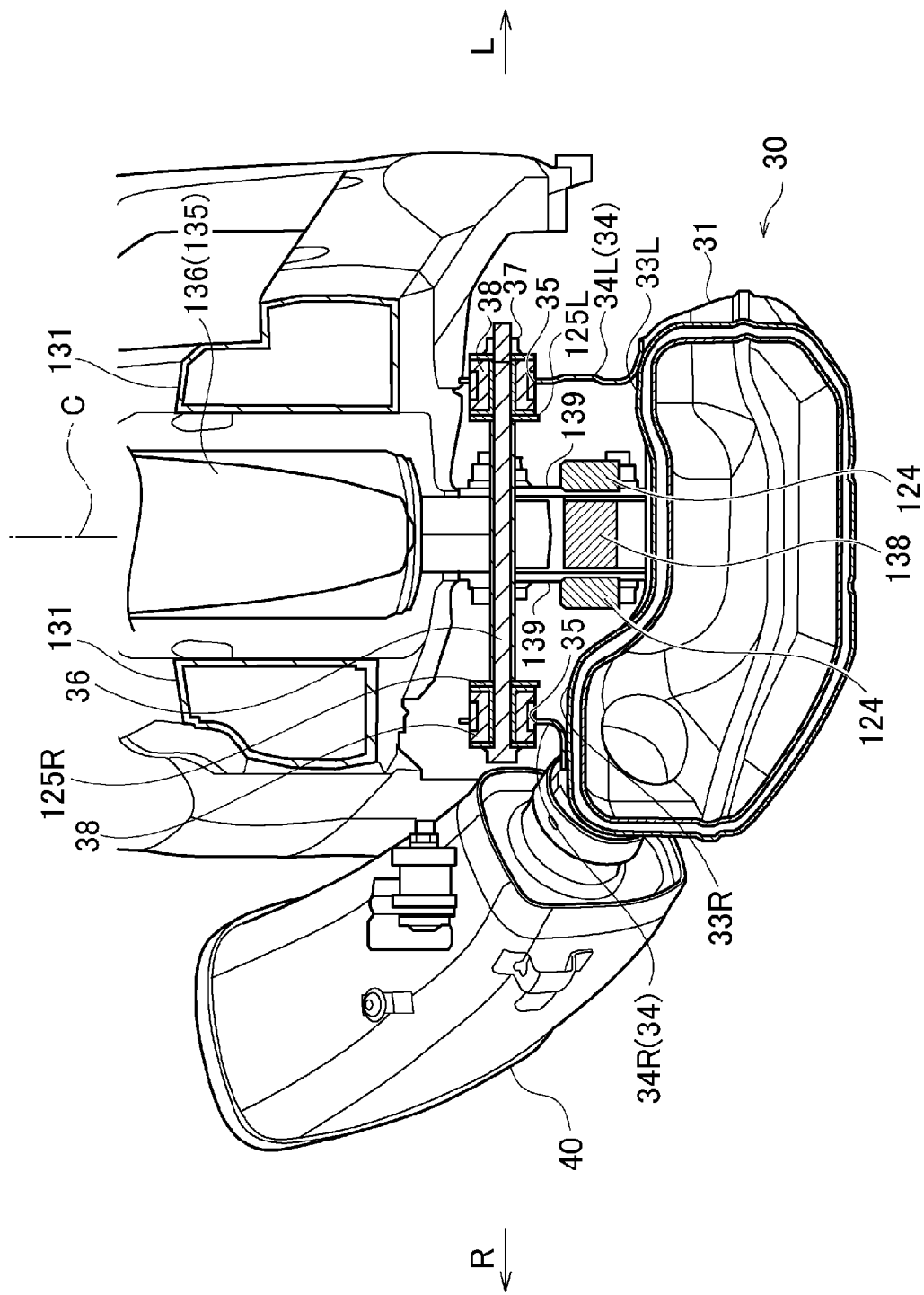
FIG. 8 is a cross-sectional view taken along the line II-II in FIG. 7.

The following describes the securing structure of the chamber portion 30. FIG. 7 is a left side view illustrating the configuration around the chamber portion 30. FIG. 8 is a cross-sectional view taken along the line II-II in FIG. 7 and is viewed from the arrow direction. FIG. 9 is a cross-sectional view taken along the line III-III in FIG. 7 and is viewed from the arrow direction.

The chamber portion 30 includes a main body portion 31 and a fixing bracket 34. The main body portion 31 is formed into an approximately box shape and the inside is partitioned into a plurality of spaces. As illustrated in FIG. 8 and FIG. 9, the main body portion 31 is disposed at a position overlapping the swing arms 131 in the vehicle plan view. The main body portion 31 is widely formed in the vehicle-width direction across the vehicle center line C. Specifically, the main body portion 31 is formed wider than the respective width dimensions of the first link member 138, the right and left pair of second link members 139, and the rear cushion unit 135 in the vehicle-width direction.

As illustrated in FIG. 5, the front portion of the main body portion 31 is positioned below the frame bridge portion 101C of the frame 101. The rear portion is positioned below the rear cushion unit 135. The top surface on the front portion of the main body portion 31 is formed into a planar shape. The top surface on the rear portion is formed into a concavo-convex shape. Specifically, in the top surface on the rear portion of the main body portion 31, a hollow portion 32 is formed at the center in the vehicle-width direction. The hollow portion 32 prevents interference between the main body portion 31 and the first link member 138. Meanwhile, a right side convex portion 33R and a left side convex portion 33L, which bulge upward, are formed at the right side and the left side sandwiching the hollow portion 32. As illustrated in FIG. 5 and FIG. 7, in the vehicle side view, the right side convex portion 33R and the left side convex portion 33L are positioned rearward with respect to the pivot shaft 111 and below the rear cushion unit 135. Thus, forming the right side convex portion 33R and the left side convex portion 33L at the main body portion 31 allows widely securing the internal volume of the chamber portion 30.

In the main body portion 31 of this embodiment, the right side convex portion 33R is positioned upward of the left side convex portion 33L. Specifically, as illustrated in FIG. 7, although the left side convex portion 33L does not overlap the first link member 138, as illustrated in FIG. 5, the right side convex portion 33R bulges upward up to the position where the right side convex portion 33R overlaps the most part of the first link member 138. That is, although the right side convex portion 33R covers the first link member 138 from the right side, the left side convex portion 33L does not cover the first link member 138 from the left side.

As illustrated in FIG. 9, although the left side convex portion 33L hardly overlaps the frame bridge portion 101C, the right side convex portion 33R bulges upward up to the position where right side convex portion 33R overlaps the frame bridge portion 101C. That is, the right side convex portion 33R bulges upward more than the lower end of the frame bridge portion 101C. Thus bulging the right side convex portion 33R upward allows widely securing a coupling area to couple the silencer 40 at the rear side of the chamber portion 30, allowing easy coupling of the silencer 40.

Next, as illustrated in FIG. 4, the fixing brackets 34 are joined to the top surfaces of the right side convex portion 33R and the left side convex portion 33L. Specifically, a right side fixing bracket 34R is joined to the top surface of the right side convex portion 33R by welding. A left side fixing bracket 34L is joined to the top surface of the left side convex portion 33L by welding. The right side fixing bracket 34R and the left side fixing bracket 34L each project upward and the fixing holes 35 are drilled to the upper portions.

Joining the right side fixing bracket 34R and the right side support plate 125R, and the left side fixing bracket 34L and the left side support plate 125L secures the chamber portion 30 to the frame bridge portion 101C. Specifically, a bolt 36 as a tightening member is inserted into the fixing hole 35 of the right side fixing bracket 34R, a fixing hole 126 of the right side support plate 125R, the fixing hole 126 of the left side support plate 125L, and a fixing hole 35 of the left side fixing bracket 34L from the vehicle lateral side, and is tightened with nuts 37, thus securing the bolt 36. Between the fixing hole 35 and the fixing hole 126, a bush 38 is interposed. The bush 38 minimizes transmission of vibration between the frame bridge portion 101C and the chamber portion 30.

As described above, the right side support plate 125R and the left side support plate 125L extend obliquely upward to the rear from the top surface of the frame bridge portion 101C. Additionally, the right side fixing bracket 34R and the left side fixing bracket 34L project upward. Accordingly, as illustrated in FIG. 5, a fixed position P1 (the position of the bolt 36) of the frame bridge portion 101C and the chamber portion 30 is positioned upward with respect to the lower end of the frame bridge portion 101C. Thus positioning the fixed position P1 upward with respect to the lower end of the frame bridge portion 101C allows reducing a projection of the frame bridge portion 101C downward with respect to the lower end of the frame bridge portion 101C. Accordingly, a wide space is formed below the frame bridge portion 101C. This allows widely securing the internal volume of the chamber portion 30, which is disposed below the frame bridge portion 101C. In this embodiment, the fixed position P1 is positioned upward with respect to the upper end of the frame bridge portion 101C. This allows further widely securing the internal volume of the chamber portion 30.

Since this allows reducing the projection of the frame bridge portion 101C to downward, a smooth space is formed below the frame bridge portion 101C. Accordingly, the chamber portion 30, which is disposed below the frame bridge portion 101C, a degree of freedom of shape, such as ensuring a simplified shape, can be improved. The fixed position P1 of the frame bridge portion 101C and the chamber portion 30 is positioned upward with respect to the lower end of the frame bridge portion 101C. This allows improving work efficiency of securing the chamber portion 30 to the frame bridge portion 101C.

The right side fixing bracket 34R and the left side fixing bracket 34L are joined to the top surfaces of the right side convex portion 33R and the left side convex portion 33L, respectively. That is, in the main body portion 31, by an amount of coupling the right side convex portion 33R and the left side convex portion 33L, which bulge upward, the vertical lengths of the right side fixing bracket 34R and the left side fixing bracket 34L can be shorten. This allows improving mounting rigidity of the chamber portion 30, ensuring strongly securing the chamber portion 30.

As illustrated in FIG. 5, the right side convex portion 33R is positioned rearward with respect to the pivot shaft 111 and upward with respect to the lower end of the frame bridge portion 101C. This position is a space where the first link member 138, the second link member 139, which is the rear wheel suspension device 130, or a similar member is not disposed. Accordingly, forming the right side convex portion 33R in this space allows bulging the right side convex portion 33R further upward, allowing widely securing the internal volume of the chamber portion 30. Although the position where the right side convex portion 33R is disposed is rearward with respect to the pivot shaft 111, the position is forward with respect to the coupling position of the swing arm 131 with the second link member 139. At the position, an amount of vertical swing of the swing arm 131 is comparatively small. This allows bulging the right side convex portion 33R further upward, allowing widely ensuring the internal volume of the chamber portion 30.

In the vehicle side view, the fixed position P1 of the right side support plate 125R and the right side fixing bracket 34R and the fixed position P1 of the left side support plate 125L and the left side fixing bracket 34L are at the identical position. Accordingly, by the amount of bulging the right side convex portion 33R upward more than the left side convex portion 33L, the length of the left side fixing bracket 34L is formed longer than the right side fixing bracket 34R in the vertical direction. Accordingly, in the vehicle side view, while the first link member 138 overlaps the right side convex portion 33R at the right side of the chamber portion 30, the first link member 138 overlaps the left side fixing bracket 34L at the left side of the chamber portion 30.

Thus, in the vehicle plan view, the right side convex portion 33R and the left side fixing bracket 34L are positioned so as to overlap the first link member 138. That is, the right side convex portion 33R and the left side fixing bracket 34L project upward so as to pass through the gap of the rear wheel suspension device 130. As illustrated in FIG. 5, the fixed position P1 of the frame bridge portion 101C and the chamber portion 30 is positioned above a mounting position P2 at which the first link member 138 is mounted to the link support portion 124. In the vehicle side view, this fixed position P1 is a dead space surrounded by the swing arm 131 at the upper side, the first link member 138 at the lower side, the rear cushion unit 135 at the rear side, and the frame body portion 101B at the front side. Thus disposing the fixed position P1 in the dead space allows effectively utilizing the space, allowing widely securing the internal volume of the chamber portion 30. The fixed position P1 is positioned rearward with respect to the frame bridge portion 101C and the side close to the silencer 40. This allows further stably supporting the chamber portion 30 and the silencer 40.

The fixing bracket 34 is constituted of the right side fixing bracket 34R and the left side fixing bracket 34L, which are separated to the right and left on the main body portion 31 of the chamber portion 30. The use of the two brackets separated to the right and left allows further stably supporting the chamber portion 30. The fixing hole 35 of the right side fixing bracket 34R and the fixing hole 35 of the left side fixing bracket 34L are tightened together with the one bolt 36. This allows improving work efficiency when securing the chamber portion 30 to the frame bridge portion 101C.

The present invention has been described with the above-described embodiments. However, the present invention is not limited only to the above-described embodiments, and modification or a similar change is possible within the scope of the present invention.

This embodiment describes the case where the motorcycle is applied as the saddle-ride type vehicle. However, this should not be construed in a limiting sense. The embodiment is also applicable to three-wheeled automobiles or a similar vehicle.

This embodiment describes the case where the four-cylinder engine is used as the engine 115. However, the count of cylinders of the engine 115 is appropriately selectable, for example, the count of cylinders may be a single cylinder. In the case of using the single cylinder engine, the exhaust pipe portion 20 can be constituted of one exhaust pipe.

The chamber portion 30 of this embodiment describes the case where the right side convex portion 33R bulges upward with respect to the left side convex portion 33L. However, the left side convex portion 33L may also bulge upward so as to be the identical height to the right side convex portion 33R. In this case, by the amount of projecting the left side convex portion 33L upward, the vertical length of the left side fixing bracket 34L can be shorter. This allows improving the mounting rigidity of the chamber portion 30.

This embodiment describes the case where the right side convex portion 33R overlaps the first link member 138 while the left side convex portion 33L does not overlap the first link member 138. However, the left side convex portion 33L may be bulged upward so as to overlap the first link member 138. In this case, the first link member 138 is surrounded by the hollow portion 32 of the main body portion 31 at the lower side, the right side convex portion 33R and the left side convex portion 33L at the right and left sides. This allows effectively utilizing the empty space by the amount, allowing widely securing the internal volume of the chamber portion 30.

This embodiment describes the case where the fixed position P1 of the frame bridge portion 101C and the chamber portion 30 is positioned above the upper end of the frame bridge portion 101C. However, this should not be construed in a limiting sense. It is only necessary that the fixed position P1 be positioned above the lower end of the frame bridge portion 101C. This case also allows reducing the projection downward more than the lower end of the frame bridge portion 101C. This allows widely securing the internal volume of the chamber portion 30.

This embodiment describes the case where the rear wheel suspension device 130 is disposed at the center in the vehicle-width direction. However, this should not be construed in a limiting sense. The rear wheel suspension device 130 may also be disposed at the approximately center in the vehicle-width direction or biased to one side or the other side in the vehicle-width direction. Even if the rear wheel suspension device 130 is disposed biased in the vehicle-width direction, positioning the right side convex portion 33R and the left side fixing bracket 34L so as to overlap the first link member 138 in the vehicle plan view provides the effects similar to the above-described effects.

The exhaust system 10 of this embodiment describes the configuration of directly coupling the silencer 40 to the chamber portion 30. However, this should not be construed in a limiting sense. The exhaust system 10 may have a configuration where the silencer 40 is indirectly coupled to the chamber portion 30 via a pipe (not illustrated) or a similar member.

According to the present invention, the wide space can be formed at the lower side of the frame. This allows widely securing the internal volume of the chamber portion disposed at the lower side of the frame.

What is claimed is:

1. An exhaust system of a saddle-ride type vehicle, comprising:
   an exhaust pipe portion coupled to an engine supported by a frame, the exhaust pipe portion being configured to guide exhaust air;
   a chamber portion coupled to the exhaust pipe portion, the chamber portion whose cross section being formed larger than the exhaust pipe portion; and
   a silencer coupled to the chamber portion, wherein
   the chamber portion comprises:
      a main body portion disposed below the frame, and
      a fixing bracket projecting upward from the main body portion, the fixing bracket being secured to the frame,
   the frame and the fixing bracket have a fixed position, the fixed position being positioned above a lower end of the frame, and
   the main body portion has a convex portion on either end, which bulges more upward than a center of the main body in the vehicle-width direction, formed at a top surface on the edge portion in the vehicle-width direction, and the fixing bracket is joined to the top surface of the convex portion.

2. The exhaust system of the saddle-ride type vehicle according to claim 1, wherein
   the convex portion is positioned rearward with respect to a pivot shaft and upward with respect to a lower end of the frame, the pivot shaft supporting a swing arm.

3. The exhaust system of the saddle-ride type vehicle according to claim 1, wherein
   in a vehicle side view, the fixing bracket or the convex portion overlaps a part of a rear wheel suspension device, and
   the fixed position is positioned above a mounting position of the frame and the rear wheel suspension device.

4. The exhaust system of the saddle-ride type vehicle according to claim 1, wherein
   the fixing bracket has two fixing brackets joined to the main body portion separately to a right and left, and
   the two fixing brackets are tightened together and secured to the frame with a tightening member.

5. The exhaust system of the saddle-ride type vehicle according to claim 1, wherein
   the main body portion has a hollow portion in the top surface at the center in the vehicle-width direction and has a pair of the convex portion at the right side and the left side sandwiching the hollow portion in the vehicle-width direction, and
   the fixing bracket has a pair of the fixing bracket joined to a top surface of the pair of the convex portion, respectively.

6. The exhaust system of the saddle-ride type vehicle according to claim 5, wherein
   a rear wheel suspension device is disposed on an upper side of the hollow portion.

7. The exhaust system of the saddle-ride type vehicle according to claim 5, wherein
   the silencer is coupled to one side of the chamber portion in the vehicle-width direction, and
   a top surface of the one side of the pair of the convex portion, in which the silencer is jointed, is positioned upward more than a top surface of the other side of the pair of the convex portion, in which the silencer is not jointed.

* * * * *